United States Patent
Hakogi et al.

[11] Patent Number: 6,135,644
[45] Date of Patent: Oct. 24, 2000

[54] STRUCTURES FOR OPTICAL SEMICONDUCTOR MODULE, OPTICAL CONNECTOR, AND SHAPE ADAPTING OPTICAL CONNECTOR

[75] Inventors: Hironao Hakogi, Kawasaki; Katsuyoshi Naito, Tokyo; Tsutomu Nakamura, Tokyo; Masahiro Tsuchida, Tokyo; Tateomi Matsumoto, Tokyo, all of Japan

[73] Assignees: Fujitsu Limited, Kawasaki; Oki Electric Industry Co., Ltd.; Hirose Electric Co., Ltd., both of Tokyo; Sumitomo Electric Industries, Ltd., Osaka, all of Japan

[21] Appl. No.: 09/251,444

[22] Filed: Feb. 17, 1999

[30] Foreign Application Priority Data

Feb. 24, 1998 [JP] Japan .................................. 10-041483

[51] Int. Cl.[7] ...................................................... G02B 6/36
[52] U.S. Cl. ................................ 385/92; 385/58; 385/73; 385/78
[58] Field of Search .................................. 385/59, 88, 92, 385/93, 60, 58, 73, 78

[56] References Cited

U.S. PATENT DOCUMENTS

| | | | |
|---|---|---|---|
| 5,042,891 | 8/1991 | Mulholland et al. | 385/93 |
| 5,428,702 | 6/1995 | Schoss | 385/59 |

FOREIGN PATENT DOCUMENTS

| | | |
|---|---|---|
| 0 320 214 A2 | 6/1989 | European Pat. Off. . |
| 29 39 231 A1 | 4/1981 | Germany . |
| 58-090607 | 5/1983 | Japan . |
| 58-109001 | 7/1983 | Japan . |
| 59-148762 | 10/1984 | Japan . |
| 63-101407 | 7/1988 | Japan . |
| 3-247845 | 9/1991 | Japan . |
| 5-181890 | 5/1993 | Japan . |
| 7-192215 | 7/1995 | Japan . |
| 7-242711 | 9/1995 | Japan . |
| 7-266108 | 9/1995 | Japan . |
| 9-43453 | 2/1997 | Japan . |
| 9-211276 | 8/1997 | Japan . |
| 9-265026 | 10/1997 | Japan . |
| 10-041483 | 8/1999 | Japan . |

*Primary Examiner*—Phan T. H. Palmer
*Attorney, Agent, or Firm*—Evenson, McKeown, Edwards & Lenahan, P.L.L.C.

[57] ABSTRACT

An optical semiconductor module structure comprises a housing which has an optical coupling means comprising an optical semiconductor element and a ferrule accommodating an optical fiber therein, a portion of said housing for holding said ferrule being formed to be a protuberant portion, wherein said optical semiconductor module structure is provided with, for coupling an optical connector with said protuberant portion, a means for regulating said optical connector in the direction of the axis of said ferrule and a means for regulating said optical connector in a direction right to the axis of said ferrule.

9 Claims, 9 Drawing Sheets

STRUCTURES FOR OPTICAL SEMICONDUCTOR MODULE, OPTICAL CONNECTOR, AND SHAPE ADAPTING OPTICAL CONNECTOR

BACKGROUND OF THE INVENTION

1. Field of the Invention

The present invention relates to a coupling structure of an optical connector, in particular, to that of an optical connector serving as an optical connecting device to be connected to a small-sized optical component which is, like an optical semiconductor module used in an optical communication system and others, fixed to a board.

2. Description of Prior Art

There have been developed and used various types of optical connectors and some of them are disclosed in Japanese Patent Provisional Publications No. 211276 of 1997, No. 43453 of 1997, and No. 265026 of 1997. Among them, in an embodiment where an optical semiconductor module disclosed in Japanese Patent Provisional Publication No. 211276 of 1997 and an optical connecting device using the optical semiconductor module are employed, the embodiment has an optical semiconductor module, which has a package body accommodating a semiconductor laser and an optical fiber optically coupled thereto and double side walls respectively provided with a recess and formed in the traveling way of the laser light radiated from the semiconductor laser, and a simplified connector to be coupled with said module, having a recess in the inner wall holding a ferrule to which one end of the optical fiber is fixed, and being provided at its front end with a protuberance, and optical fibers are optically coupled with each other through the coupling of the ferrules by coupling the simplified connector with the optical semiconductor module.

Though these conventional optical connectors are suitable, to some extent, for producing a large amount of low cost and small-sized optical semiconductor modules indispensable in optical fiber communication systems, they usually still have some following problems. That is to say, special tools are necessary for centering the ferrules during the assembly work of coupling the module with the connector, and this makes the assembly difficult. In case that the coupling sequence for a mate optical semiconductor module starts from a ferrule and there is no means to ensure the centering for the ferrules, a successful coupling is hard, the ferrule or a sleeve is sometimes damaged, and the coupling work eventually becomes difficult. Further, even if there is a guide means for centering the ferrules, this guide means does not sufficiently answer the need of low cost because the guide means is provided as a member completely independent of a lock means for locking the coupling of the mate optical semiconductor module, and this causes an increase in the number of components. Furthermore, the optical connection has been unstable due to the lack of means for ensuring the ferrule alignment after the coupling.

An object of the present invention is to provide a structure allowing the conventional technological problems described above to be eliminated for an optical semiconductor module, an optical connector, or a shape adapting optical connector.

SUMMARY OF THE INVENTION

According to an aspect of the present invention, there is provided an optical semiconductor module structure provided with a housing which has an optical coupling means comprising an optical semiconductor element and a ferrule accommodating an optical fiber therein, a portion of said housing for holding said ferrule being formed to be a protuberant portion, wherein said optical semiconductor module structure is provided with, for coupling an optical connector with said protuberant portion, a means for regulating said optical connector in the direction of the axis of said ferrule and a means for regulating said optical connector in a direction right to the axis of said ferrule.

According to another aspect of the present invention, there is provided, an optical semiconductor module structure provided with a housing which has an optical coupling means comprising an optical semiconductor element and a ferrule accommodating an optical fiber therein, a portion of said housing for holding said ferrule being formed to be a protuberant portion, wherein said optical semiconductor module structure is provided with, for coupling an optical connector with said protuberant portion, a means for guiding said optical connector and also locking the coupling of said optical connector.

According to an embodiment of the present invention, the housing of the optical semiconductor module structure may have a means for regulating the direction of an optical connector to be inserted.

According to another embodiment of the present invention, the housing of the optical semiconductor module structure may be provided with a means for regulating a plurality of directions of an optical connector to be inserted.

According to still another embodiment of the present invention, the ferrule in the optical semiconductor module structure may be coupled via a split sleeve with an optical connector.

According to still another aspect of the present invention, there is provided an optical connector structure, comprising a housing having a ferrule holding portion for holding a ferrule connected to an optical fiber, an elastic arm provided to said housing for retaining an optical coupling means, a means provided to said elastic arm for regulating said optical coupling means in the direction of the axis of said ferrule, and a means provided to said elastic arm for regulating said optical coupling means in a direction right to the axis of said ferrule.

According to still another aspect of the present invention, there is provided a shape adapting optical connector structure, comprising a housing having a ferrule holding portion for holding a ferrule connected to an optical fiber, an elastic arm provided to said housing for retaining an optical coupling means, a means provided to said elastic arm for regulating said optical coupling means in the direction of the axis of said ferrule, and a means provided to said elastic arm for regulating said optical coupling means in a direction right to the axis of said ferrule, wherein said structure allows an optical coupling between differently-shaped optical coupling means.

Referring to the attached drawings, an embodiment of the present invention will hereafter be described in details.

DESCRIPTION OF THE PREFERRED EMBODIMENTS

Figure 1:
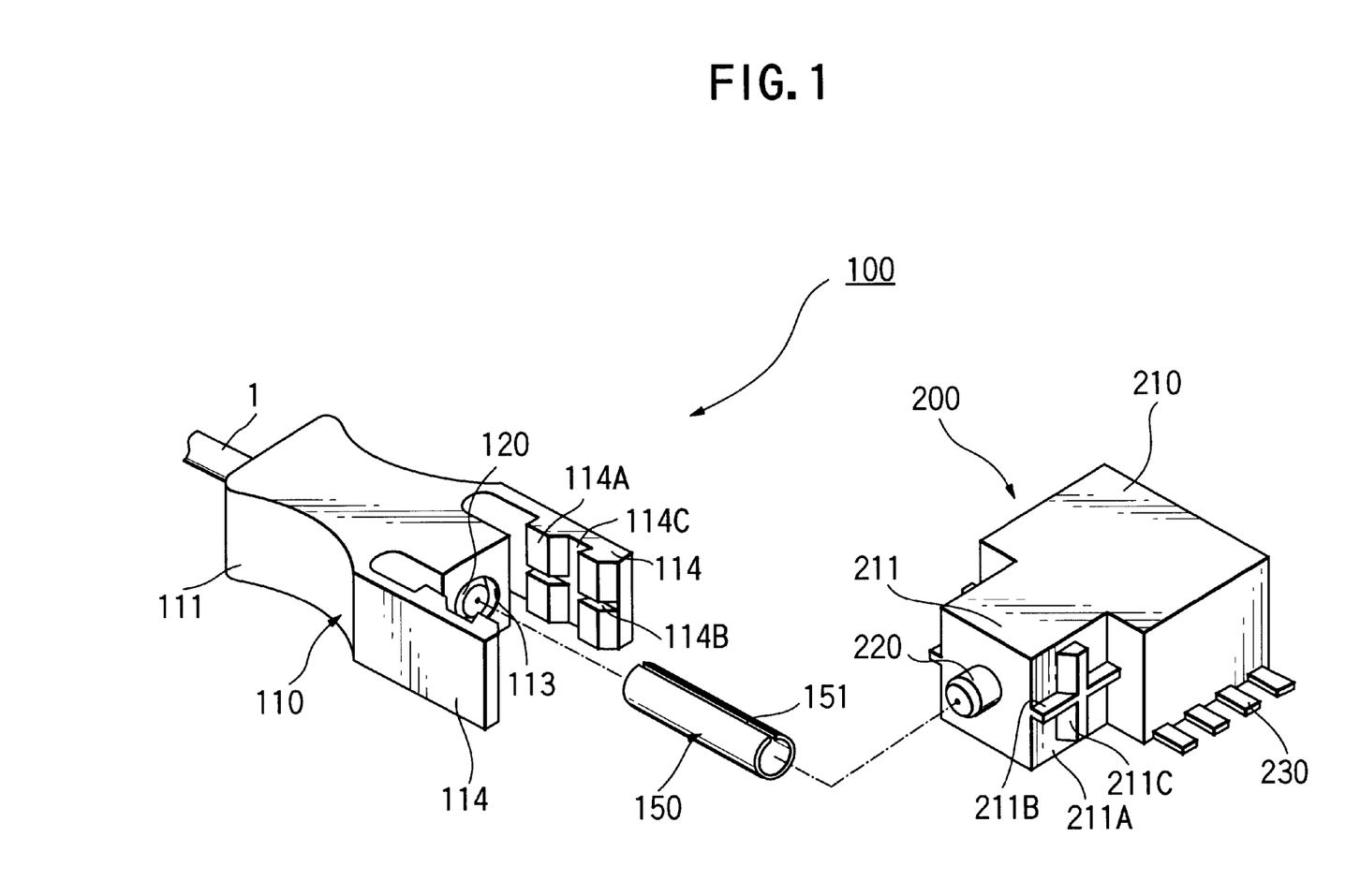
FIG. 1 is a perspective and exploded view which shows an optical connector having a coupling structure as an embodiment of the present invention and an optical semiconductor module to be coupled with the optical connector.

FIG. 1 is a perspective and exploded view, illustrating an optical connector having a coupling structure as an embodiment of the present invention and an optical semiconductor module with which this optical connector is coupled. An optical connector 100, as shown in FIG. 1, comprises a housing 110 mainly made of such as plastic, a ferrule 120 for an optical fiber of an optical cable 1 to be connected, and a split sleeve 150 for aligning the ferrules with each other. On the other, an optical semiconductor module 200 comprises a housing 210 mainly made of such as plastic, and a ferrule 220 which is held by the housing 210 and is aligned with a light emitting source (not shown), like a semiconductor laser, disposed inside the housing 210. In the illustrated embodiment, the optical semiconductor module 200 is mounted on a printed circuit board (PCB)(not shown) and has a plurality of connecting terminals 230 surface-mounted on a conductor on the PCB.

Figure 2:
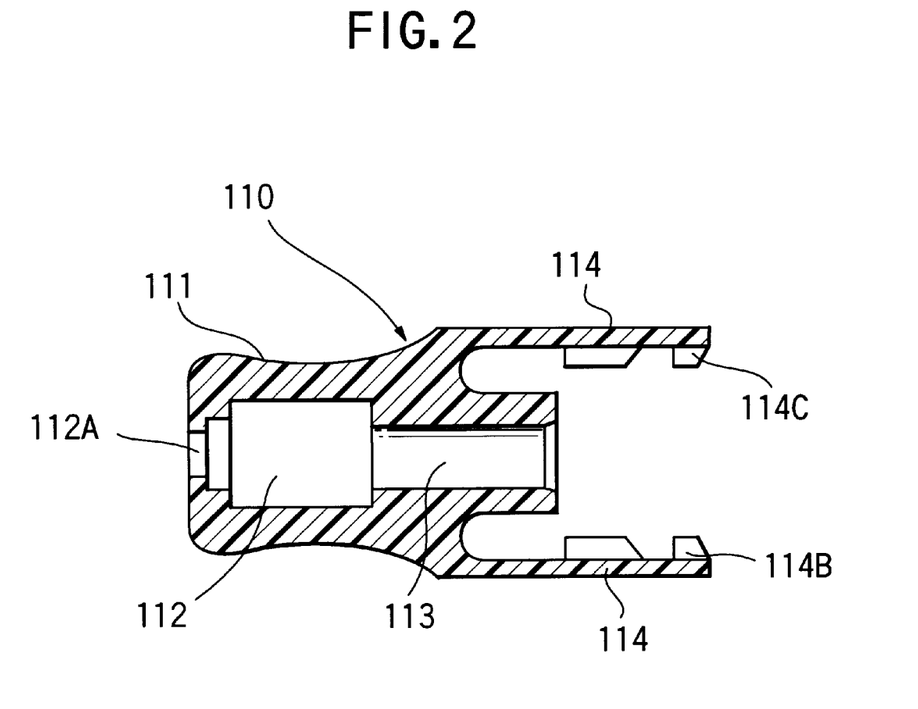
FIG. 2 is a sectional view of a housing of the optical connector of FIG. 1.
Figure 3:
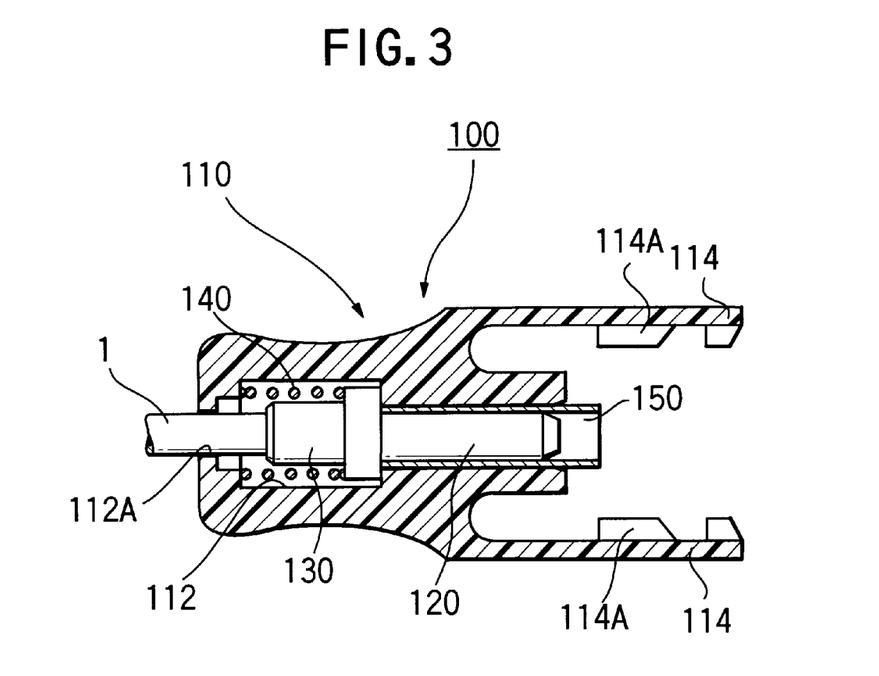
FIG. 3 is a sectional view showing how a ferrule assembly is installed in the housing of the optical connector of FIG. 1.

FIG. 2 is a sectional view of the housing 110 of the optical connector 100, and the structure of the housing 110 will be detailed with the reference to FIG. 1 and FIG. 2. The housing 110 has at its rear part a holding portion 111 formed to be easily held by two fingers (for example, a thumb and an index finger) and this holding portion 111 has at its middle part a hollowed space 112 for accommodating a ferrule assembly comprising the ferrule 120, a flange portion 130, and a deflection spring 140 (hereafter referred to as a ferrule assembly accommodating space 112). The central part of the rear end of the ferrule assembly accommodating space 112 is provided with an opening 112A through which the optical cable 1 is allowed to extend out. The housing 110 has at its virtually middle part a through passage 113, which is formed to communicate with the ferrule assembly accommodating space 112 and whose inner diameter is large enough to hold the front end part of the ferrule 120 and the rear end part of a split sleeve 150 (hereafter referred to as a ferrule holding through passage 113). For this ferrule holding through passage 113, the housing has a pair of elastic arms 114 for guiding and locking the mate connector (hereafter referred to as guide/lock elastic arm 114) on the side of and the outer side of the mate connector, for example, the optical semiconductor module 200.

As clearly shown in FIG. 1, the guide/lock elastic arm 114, formed as a cantilever allowed elastically to open a little outward, is integrated with the body of the housing 110. This guide/lock elastic arm 114 has on the inner wall of its front end part a lock protuberance 114A for locking the coupled optical semiconductor module 200 as the mate connector. The lock protuberance 114A has guide grooves 114B, 114C formed in a cross as a whole for guiding and locating the ferrule 220 of the optical semiconductor module 200 as the mating connector. As described in later, these guide grooves 114B, 114C guide and locate the mate connector regarding its vertical and lateral directions respectively in FIG. 1, and therefore eventually fulfill as a whole the role of guiding and locating the mate connector in the dual axial directions. The guide pattern of these grooves according to the present invention is not limited to a cross, and the grooves may be structured in various patterns so that they work as plural axes guides for guiding and locating the mate connector in plural directions. Such guide patterns as T-shape, Y-shape, etc. may be allowable.

The detailed structure of the housing 210 of the optical semiconductor module 200 will hereafter be described with the reference of FIG. 2 illustrating a perspective view thereof clearly. The housing 210 has, on both sides 211A of its coupling portion 211, protuberant ridges 211B, 211C engaging respectively with the guide grooves 114B, 114C provided to the lock protuberance 114A arranged on the inner wall of the front end part of the guide/lock elastic arm 114 of the housing 110 of the optical connector 100.

Figure 4:
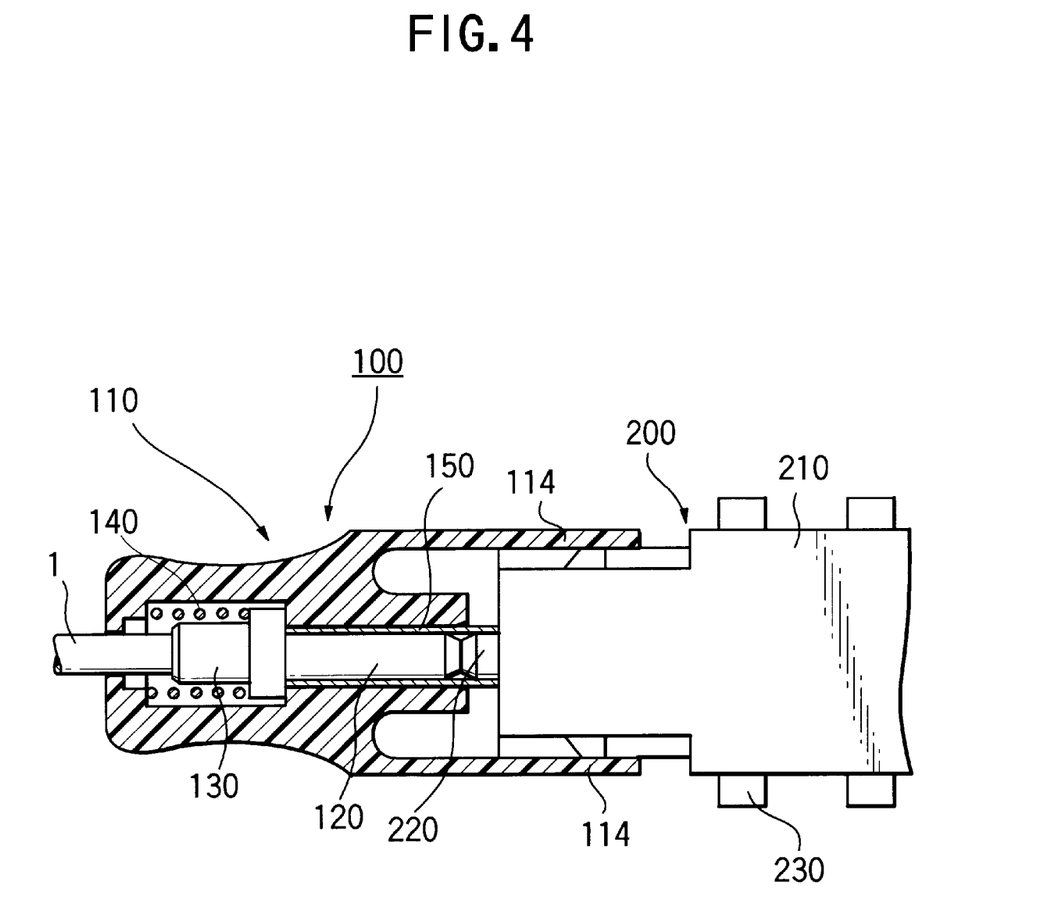
FIG. 4 is a sectional view showing how the optical connector and the optical semiconductor module of FIG. 1 are coupled with and lock each other.

How to operate and activate overall the optical connector 100 and the optical semiconductor module 200 constituted and structured as described above will hereafter be described. First, to couple the optical connector 100 with the optical semiconductor module 200, an operator holds the holding portion 111 of the rear part of the housing 110 of the optical connector 100, for example, with his thumb and index finger and push the optical connector 100 into the optical semiconductor module 200 so that the guide grooves 114B of the guide/lock elastic arms 114 on both sides of the front portion of the housing 110 engage with the protuberant stripes provided to both sides 211A of the coupling portion 211 of the housing 210 of the optical semiconductor module 200. During this process, the guide/lock elastic arm 114 is elastically deflected a little outward due to the effect of a cam face at the front end of the lock protuberance 114A which is pushed outward by the protuberant stripe 211C on the housing 210 of the optical semiconductor module 200, and the front half of the lock protuberances 114A is allowed to ride over the protuberant ridge 211C, and at the moment when the ride-over has finished, i.e., the guide groove 114C has engaged with the protuberant ridge 211C, the elastic force of deflecting the guide/lock elastic arm 114 returns the guide/lock elastic arm 114 to its original closing position. At the same moment, due to the precise guide and location of the optical semiconductor module accomplished by the engagement between the guide groove 114B and the protuberant ridge 211B, the front portion of the split sleeve 150 provided to the ferrule 120 of the optical connector module 100 is correctly coupled with the front portion of the ferrule 220 of the optical semiconductor module 200. When the guide/lock elastic arm 114 has been closed, the guide grooves 114B, 114C engage with the protuberant ridges 211B, 211C respectively and the ferrules 120, 220 are correctly aligned each other, and the optical connector 100 and the optical semiconductor module 200 couple with and lock up each other. FIG. 4 is a sectional view illustrating how the optical connector 100 and the optical semiconductor module 200 which couple with and lock up each other.

In the embodiment above, a type of mate connector to be coupled with an optical connector is described as a type of optical semiconductor module placed on a printed circuit board, but the present invention, not being limited to such type of mate connector, may be applied to such type of mate connector to be connected to an optical cable. In the embodiment above, the optical connector has on its housing side a guide/lock elastic arm and the optical semiconductor module as the mate connector has on its housing side a protuberant stripe engaging with the guide/lock elastic arm, but the roles of the optical connector and the mate connector for the lock mechanism are interchangeable and therefore the present invention, not being limited to the embodiment above, for example, may be applied to such a case that a mate connector and an optical connector have on their housing sides a similar guide/lock elastic arm and a similar protuberant ridge engaging with the guide/lock elastic arm respectively.

Figure 5:
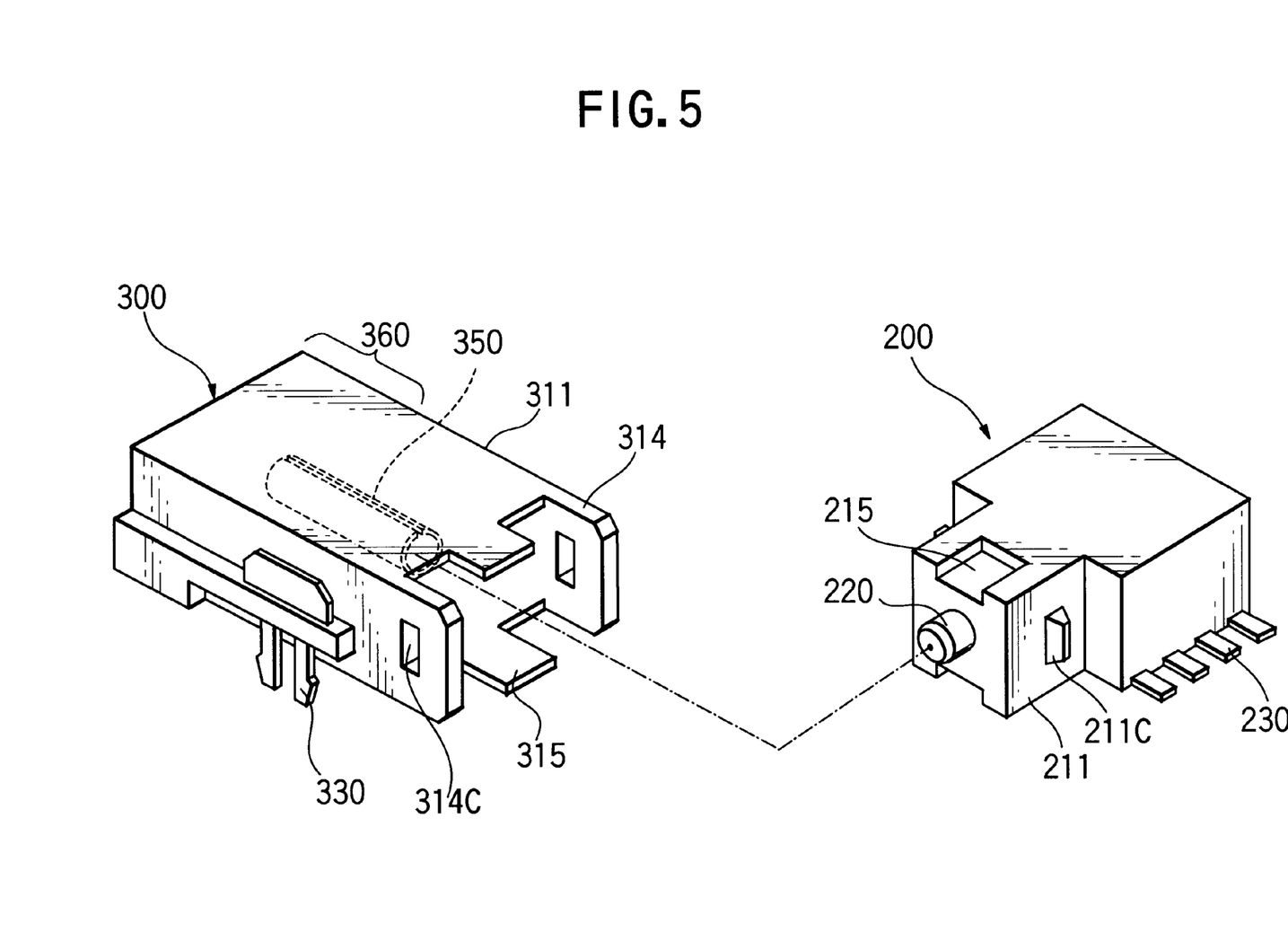
FIG. 5 is a perspective view of a constitution comprising a shape adapting connector of the present invention and an optical semiconductor module.
Figure 6A:
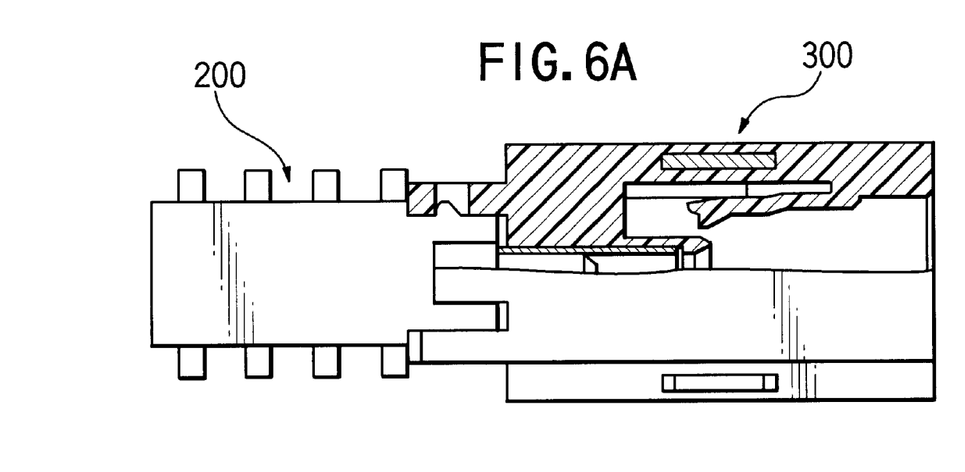
FIGS. 6A, 6B and 6C show front, side, and plan views illustrating how the shape adapting connector and the optical semiconductor module shown in FIG. 5 are coupled with each other.
Figure 6B:
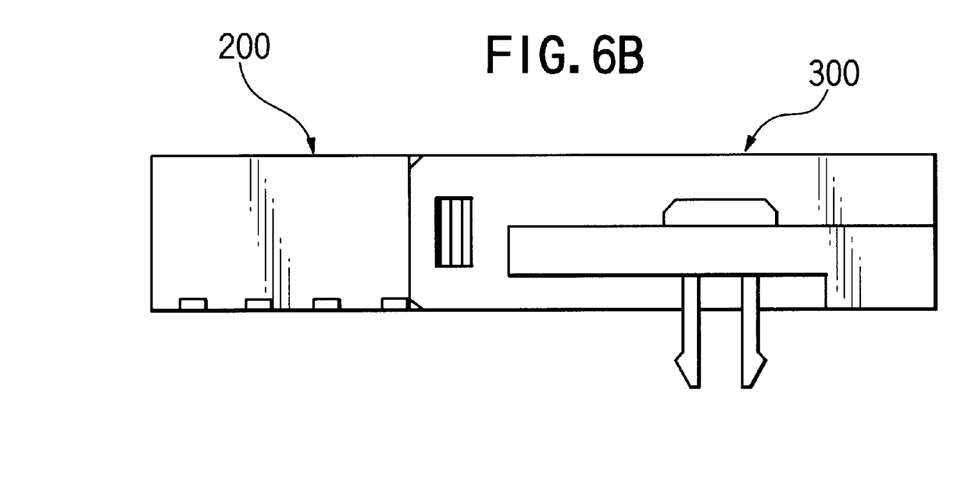
Figure 6C:
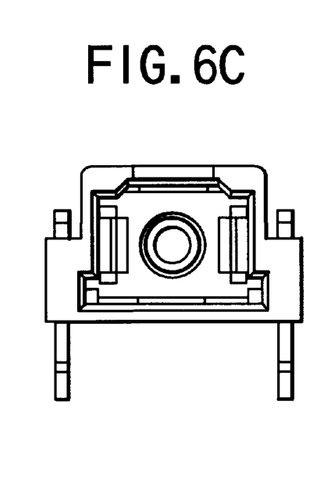
Figure 7:
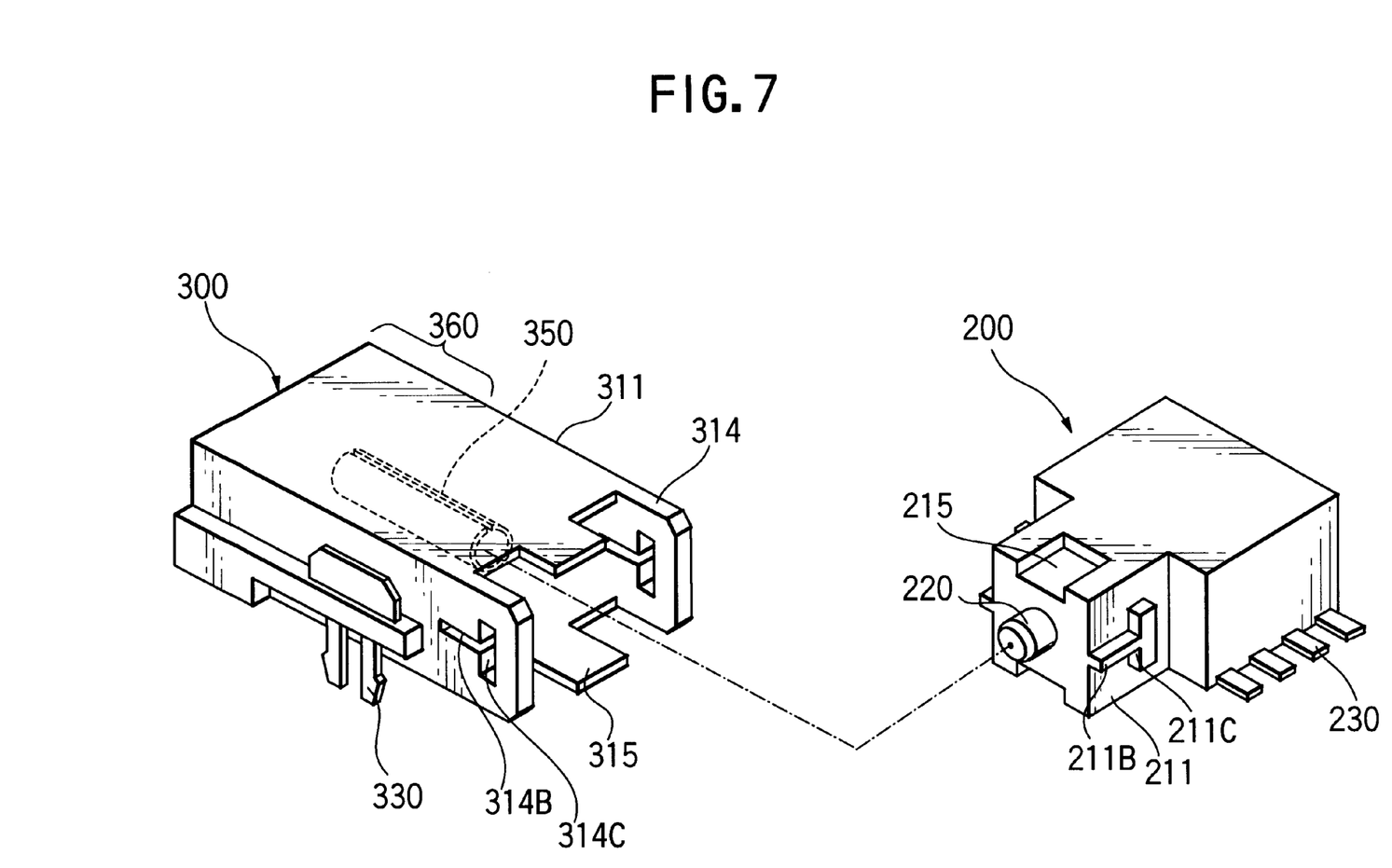
FIG. 7 is a perspective view of another constitution comprising a shape adapting connector of the present invention and an optical semiconductor module.
Figure 8A:
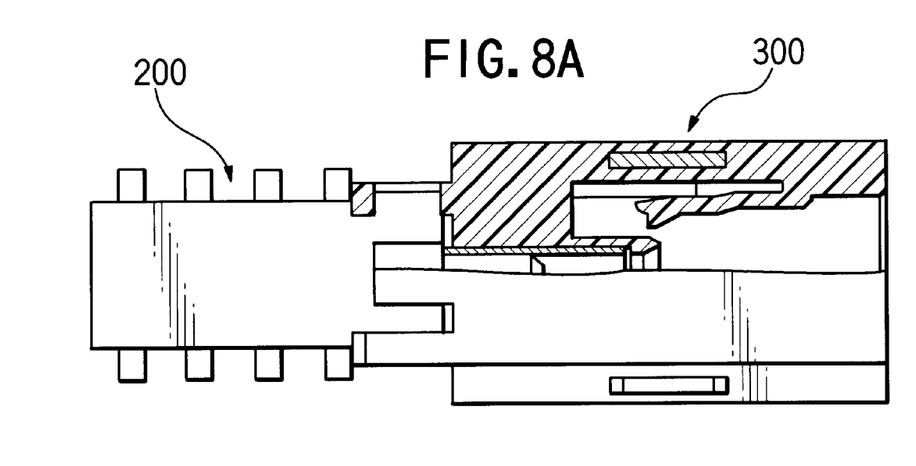
FIGS. 8A, 8B and 8C show front, side, and plan views illustrating how the shape adapting connector and the optical semiconductor module shown in FIG. 7 are coupled with each other.
Figure 8B:
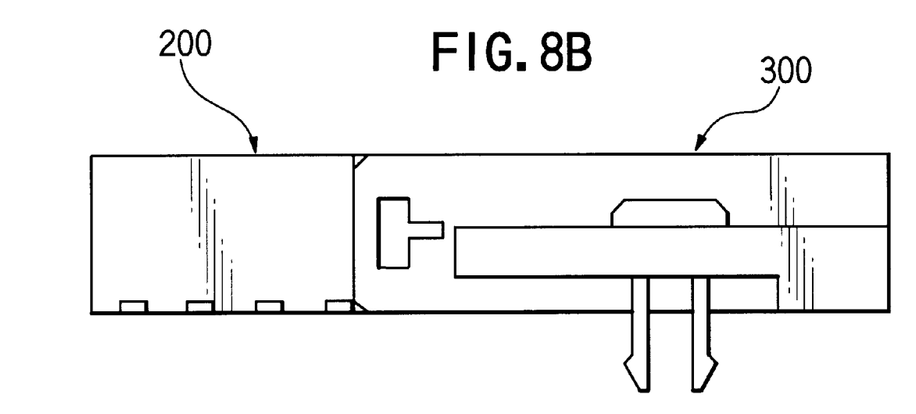
Figure 8C:
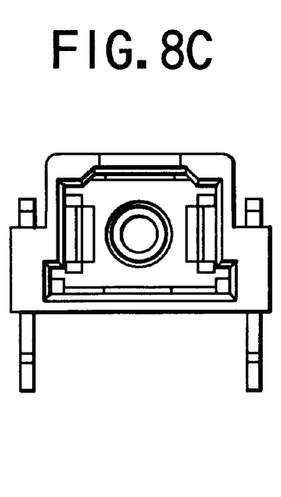
Figure 9:
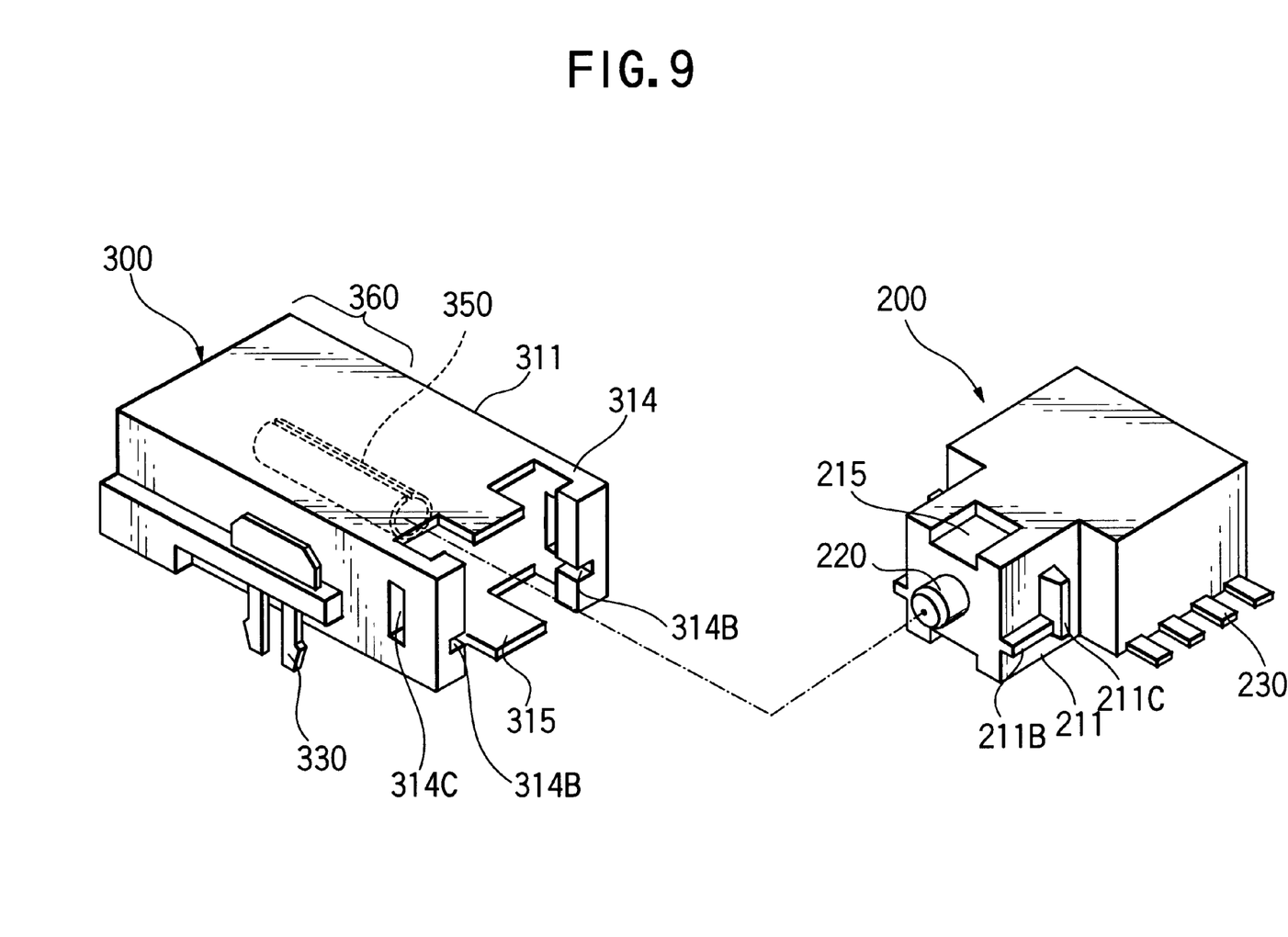
FIG. 9 is a perspective view of still another constitution comprising a shape adapting connector of the present invention and an optical semiconductor module.
Figure 10A:
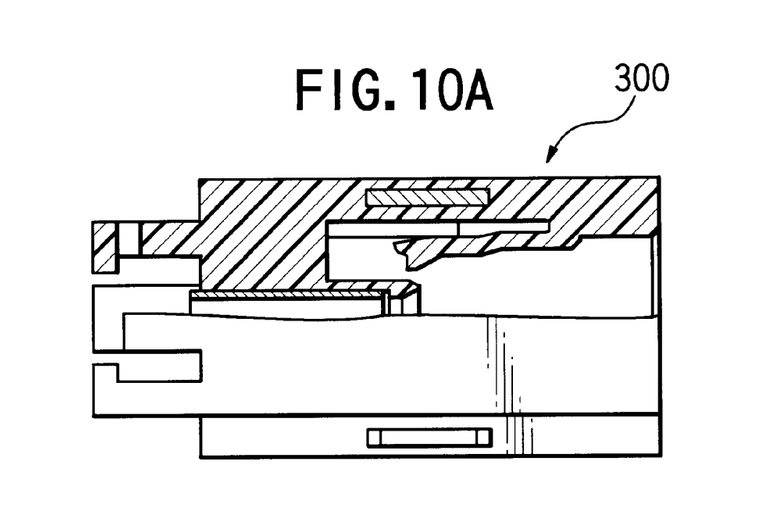
FIGS. 10A, 10B and 10C show front, side, and plan views of the shape change connector illustrated in FIG. 9.
Figure 10B:
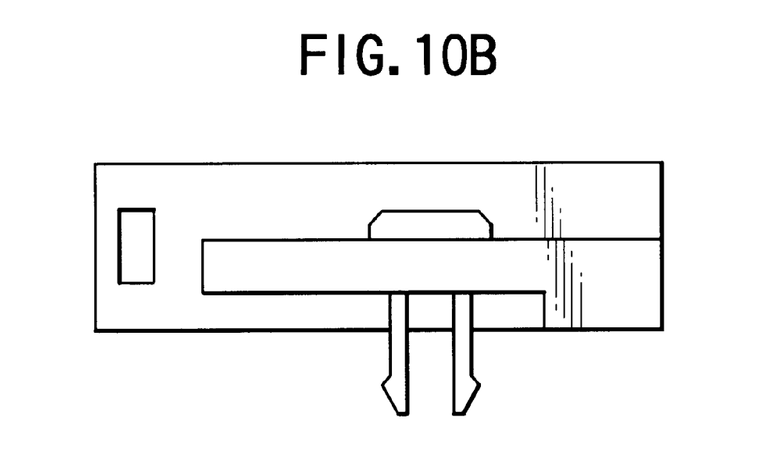
Figure 10C:
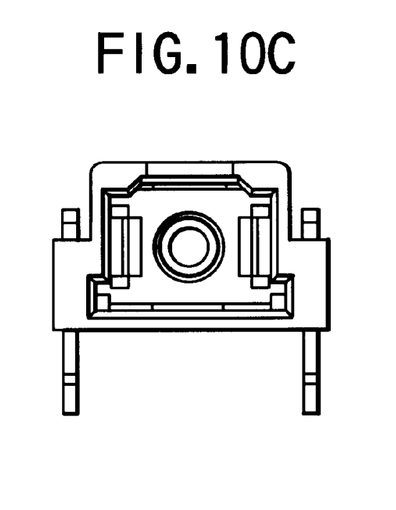

FIG. 5 is a perspective view of a constitution of a shape adapting connector of the present invention and an optical semiconductor module. FIGS. 6A, 6B, 6C are respectively front, side, and plan views illustrating how the shape adapting connector and the optical semiconductor module shown in FIG. 5 are coupled with each other. FIG. 7 is a perspective view of another constitution of a shape adapting connector of the present invention and an optical semiconductor module, and FIGS. 8A, 8B, 8C are respectively front, side, and plan views illustrating how the shape adapting connector and the optical semiconductor module shown in FIG. 7 are coupled with each other. FIG. 9 is a perspective view of another constitution of a shape adapting connector of the present invention and an optical semiconductor module, and FIGS. 10A, 10B, 10C are respectively front, side, and plan views illustrating the shape adapting connector shown in FIG. 9. FIGS. 5 to 10 show embodiments of an adapter to which the present invention is applied for an optical semiconductor module and a MU connector specified in JIS.

As shown in these FIGS., the adapter 300 has at its center a split sleeve 350 held by a housing 311, a coupling portion on the side of the MU connector, coupling portions 314, 315 to be coupled with an optical semiconductor module 200, and a protuberance 330 fixed to board (or threaded protuberance fixed to side wall) provided to the bottom of the adapter 300. The coupling portion 314 is a guide/lock elastic arm of the present invention, and the coupling portion 315 is an auxiliary guide.

When the optical semiconductor module 200 is coupled with the adapter, a ferrule 220 protruding out of the module 200 is inserted into the split sleeve 350. On the opposite side, when the adapter 300 is coupled with the MU connector, a ferrule of the MU connector is inserted into the split sleeve 350 and thereby the ferrule on the module side and the MU connector are coupled with each other by a constant force due to a spring in the MU connector.

The present invention, without being limited to the embodiments described above, is applicable to other connectors including a SC connector specified in JIS. Especially in the embodiment of FIG. 5, a coupling portion 211 is structured to have only a protuberant ridge 211C for locking an elastic arm 314 of an optical connector. An elastic arm 314 is formed to have a groove 314C corresponding to the protuberant ridge 211C. In this embodiment, the guide of an optical connector is regulated by coupling an auxiliary guide 315 of an adapter 300 with an auxiliary guide recess 215 formed on the coupling portion 211.

Especially in an embodiment of FIG. 7, a coupling portion 211 is provided with a protuberant ridge 211B and a protuberant ridge 211C which are disposed in a T-shape. An elastic arm 314 is formed to have grooves 314B, 314C corresponding to the protuberant ridges 211B, 211C respectively. An embodiment constituted in this way, as shown in FIG. 1, can do without an auxiliary guide recess 215 formed on the coupling portion 211 and an auxiliary guide 315 of an adapter 300.

Especially in an embodiment of FIG. 9, a coupling portion 211 is provided with a protuberant ridge 211B and a protuberant ridge 211C which are disposed in a L-shape. An elastic arm 314 is formed to have grooves 314B, 314C corresponding to the protuberant ridges 211B, 211C respectively. An embodiment constituted in this way, as shown in FIG. 1 and FIG. 7, can do without an auxiliary guide recess 215 formed on the coupling portion 211 and an auxiliary guide 315 of an adapter 300.

Since the present invention allows a guide/lock elastic arm to serve as a member for guiding a mate connector to be correctly coupled with and for locking the coupling, the operability during the coupling has been improved without increasing the number of components.

Since plural axes guides formed at a guide/lock elastic arm for guiding and locating in plural directions work to restrict the alignment of the ferrules after the coupling in plural directions including vertical and longitudinal directions, that is, in the directions of plural axes, the coupling and alignment can be kept more stabilized.

Since the above embodiments of the present invention cause no increase in the number of components, they provide more inexpensive structures for an optical semiconductor module, an optical connector and a shape adapting optical connector.

What is claimed is:

1. An optical semiconductor module structure provided with a housing which has an optical coupling means comprising an optical semiconductor element and a ferrule accommodating an optical fiber therein, a portion of said housing for holding said ferrule being formed to be a protuberant portion, wherein said optical semiconductor module structure is provided with, for coupling an optical connector with said protuberant portion, a means for regulating said optical connector in the direction of the axis of said ferrule and a means for regulating said optical connector in a direction right to the axis of said ferrule.

2. An optical semiconductor module structure in accordance with claim 1, wherein said ferrule is coupled via a split sleeve with an optical connector.

3. An optical semiconductor module structure in accordance with claim 1, wherein said housing has a means for regulating the direction of an optical connector to be inserted.

4. An optical semiconductor module structure provided with a housing which has an optical coupling means comprising an optical semiconductor element and a ferrule accommodating an optical fiber therein, a portion of said housing for holding said ferrule being formed to be a protuberant portion, wherein said optical semiconductor module structure is provided with, for coupling an optical connector with said protuberant portion, a means for guiding said optical connector and also locking the coupling of said optical connector.

5. An optical semiconductor module structure in accordance with claim 4, wherein said housing is provided with a means for regulating a plurality of directions of an optical connector to be inserted.

6. An optical semiconductor module structure in accordance with claim 4, wherein said housing has a means for regulating the direction of an optical connector to be inserted.

7. An optical semiconductor module structure in accordance with claim 4, wherein said ferrule is coupled via a split sleeve with an optical connector.

8. An optical connector structure, comprising a housing having a ferrule holding portion for holding a ferrule connected to an optical fiber, an elastic arm provided to said housing for retaining an optical coupling means, a means provided to said elastic arm for regulating said optical coupling means in the direction of the axis of said ferrule, and a means provided to said elastic arm for regulating said optical coupling means in a direction right to the axis of said ferrule.

9. A shape adapting optical connector structure, comprising a housing having a ferrule holding portion for holding a ferrule connected to an optical fiber, an elastic arm provided to said housing for retaining an optical coupling means, a means provided to said elastic arm for regulating said optical coupling means in the direction of the axis of said ferrule, and a means provided to said elastic arm for regulating said optical coupling means in a direction right to the axis of said ferrule, wherein said structure allows an optical coupling between differently-shaped optical coupling means.

* * * * *